(12) United States Patent
Grotenhuis

(10) Patent No.: US 11,084,112 B2
(45) Date of Patent: Aug. 10, 2021

(54) ELECTRICAL DISCHARGE MACHINE TIME SLICE POWER SUPPLY

(71) Applicant: Johnson Technology, Inc., Muskegon, MI (US)

(72) Inventor: Kim Michael Grotenhuis, Hudsonville, MI (US)

(73) Assignee: JOHNSON TECHNOLOGY, INC., Muskegon, MI (US)

( * ) Notice: Subject to any disclaimer, the term of this patent is extended or adjusted under 35 U.S.C. 154(b) by 461 days.

(21) Appl. No.: 15/994,384

(22) Filed: May 31, 2018

(65) Prior Publication Data

US 2019/0366456 A1    Dec. 5, 2019

(51) Int. Cl.
*B23H 1/02* (2006.01)

(52) U.S. Cl.
CPC ............. *B23H 1/022* (2013.01); *B23H 1/024* (2013.01); *B23H 2300/20* (2013.01)

(58) Field of Classification Search
CPC ................................ B23H 1/022; B23H 1/024
USPC ............................................ 219/69.11–69.18
See application file for complete search history.

(56) References Cited

U.S. PATENT DOCUMENTS

| | | |
|---|---|---|
| 3,585,340 A | 6/1971 | Hockenberry |
| 3,604,885 A | 9/1971 | Inoue |
| RE28,734 E | 3/1976 | Inoue |
| 3,999,028 A | 12/1976 | Saito et al. |
| 4,357,516 A | 11/1982 | Inoue |
| 4,382,168 A | 5/1983 | Inoue |
| 4,453,069 A | 6/1984 | Inoue |
| 4,503,309 A | 3/1985 | Inoue |
| 4,672,161 A | 6/1987 | Inoue |
| 5,083,001 A | 1/1992 | Kinbara et al. |
| 5,126,525 A | 6/1992 | Kaneko et al. |
| 5,336,864 A | 8/1994 | Martin |
| 5,453,593 A | 9/1995 | Seok-Yong et al. |
| 5,496,984 A | 3/1996 | Goto |
| 5,539,178 A | 7/1996 | Taneda et al. |
| 5,874,703 A | 2/1999 | Derighetti et al. |
| 6,225,589 B1 | 5/2001 | Bartok |
| 7,268,314 B2 | 9/2007 | Satou et al. |
| 7,947,918 B2 | 5/2011 | Buhler et al. |
| 9,114,468 B2 | 8/2015 | Okane et al. |

(Continued)

FOREIGN PATENT DOCUMENTS

| | | |
|---|---|---|
| DE | 4125742 A1 | 2/1993 |
| EP | 0052197 A2 | 5/1982 |
| JP | 2013144330 | 7/2013 |

OTHER PUBLICATIONS

Machine Translation off Japanese Patent Publication JP2013144330A, Hashimoto, 2013 (Year: 2013).*

(Continued)

*Primary Examiner* — Dana Ross
*Assistant Examiner* — Michael S. Poetzinger
(74) *Attorney, Agent, or Firm* — Warner Norcross + Judd LLP

(57) ABSTRACT

The specification discloses an electrical discharge machining (EDM) system and method capable of defining an unlimited number of waveforms. The system and method define logical waveforms using a plurality of time slices, each having a voltage and a width. The time slices are applied to the system power section where they are amplified and delivered to the electrode.

10 Claims, 3 Drawing Sheets

(56) References Cited

U.S. PATENT DOCUMENTS

| | | |
|---|---|---|
| 9,278,399 B2 | 3/2016 | Okane et al. |
| 9,656,076 B2* | 5/2017 | Trier ................... A61N 1/36146 |
| 9,868,172 B2* | 1/2018 | Peters .................... B23K 9/091 |
| 2005/0098541 A1 | 5/2005 | Mohri et al. |
| 2005/0145603 A1* | 7/2005 | Goto ...................... B23H 7/065 |
| | | 219/69.12 |
| 2005/0192681 A1 | 9/2005 | Matsunaga et al. |
| 2008/0017614 A1 | 1/2008 | Oda et al. |
| 2010/0147805 A1 | 6/2010 | Ukai et al. |
| 2015/0096966 A1 | 4/2015 | Fujiwara et al. |
| 2018/0056421 A1* | 3/2018 | Furuta ................... B23H 7/065 |

OTHER PUBLICATIONS

C. Kao, Monitoring and Control of Micro-Hole Electrical Discharge Machining (PhD Dissertation 2007).

E. Toma and C. Simion, Electrical Efficiency of EDM Power Supply (Nonconventional Technologies Review 2014).

M. Yan and Y. Lai, Surface quality improvement of wire-EDM using a fine-finish power supply (International Journal of Machine Tools & Manufacturing 2007).

M. Yan and H. Chien, Monitoring and control of the micro wire-EDM process (International Journal of Machine Tools & Manufacture 2007).

K. Kolek, M. Rosol and K. Hajduk, The FPGA technology in control of Electrical Discharge Machining process (Admitted Prior Art).

M. Yan and T. Lin, Development of the Pulse Generator for Rough Cutting of Oil-based Micro Wire-EDM (Procedia CIRP 2016).

M. Yan and Y Liu, Design, analysis and experimental study of the high-frequency power supply for finish cut of wire-EDM (International Journal of Machine Tools & Manufacture 2009).

A. Minhat, N. Khamis, A. Yahya, T. Andromeda and K. Nugroho, Model of Pulsed Electrical Discharge Machining (EDM) using RL Circuit (International Journal of Power Electronics and Drive System 2014).

M. Coteata, A. Floca, O. Dodun, N. Ionescu, G. Nagit and L. Slatineanu, Pulse generator for obtaining surfaces of small dimensions by electrical discharge machining (Procedia CIRP 2016).

International Search Report and the Written Opinion of PCT/US2019/025799 dated Jun. 24, 2019.

* cited by examiner

ELECTRICAL DISCHARGE MACHINE TIME SLICE POWER SUPPLY

BACKGROUND OF THE INVENTION

The present invention relates to electrical discharge machining (EDM) systems and methods, and more particularly to control systems and power supplies for EDM systems and methods.

Electrical discharge machining (EDM), also referred to as spark machining, spark eroding, burning, die sinking, wire burning, or wire erosion, is a manufacturing process whereby a desired shape is obtained using electrical discharges. Material is removed from the workpiece by a series of rapidly recurring current discharges between two electrodes. One of the electrodes is the tool, or simply the electrode, and the other of the electrodes is the work piece.

EDM systems and methods, and control systems and power supplies for such systems and methods, are well known to those skilled in the art. FIG. 3 illustrates a typical prior art standard waveform 30 used by the systems for powering the electrode discharges. As can be seen, the waveform 30 is a set shape, and particularly a square wave, having a fixed frequency, a fixed duty cycle, and a fixed amplitude. At best, the shape and the frequency are capable of limited adjustment by adjusting the pulse "turn on" and "turn off" time (duty cycle) of the waveform. The range of modification is extremely limited. The waveform may be altered only by altering the hardware configuration of the EDM system power supply. For example, the waveform may be modified using capacitors and resisters. The waveform amplitude and the offset level from ground potential generally are not controlled.

SUMMARY OF THE INVENTION

The present invention provides a system and method for creating a logical power waveform defined by time slices. Each time slice can have a different voltage and a different width, enabling custom building of logical waveforms and cycle times.

The present power supply system and method enable control of the multiple time slices within the positive and/or negative portion of the wave. Each time slice can have a different voltage, enabling the building of wave shapes in small slices or steps.

With the present invention, essentially any logical wave shape can be built and cycled at any frequency up to the maximum component switching speed of the electronics.

These and other advantages and features of the invention will be more fully understood and appreciated by reference to the description of the current embodiment and the drawings.

DESCRIPTION OF THE CURRENT EMBODIMENT

Figure 1:
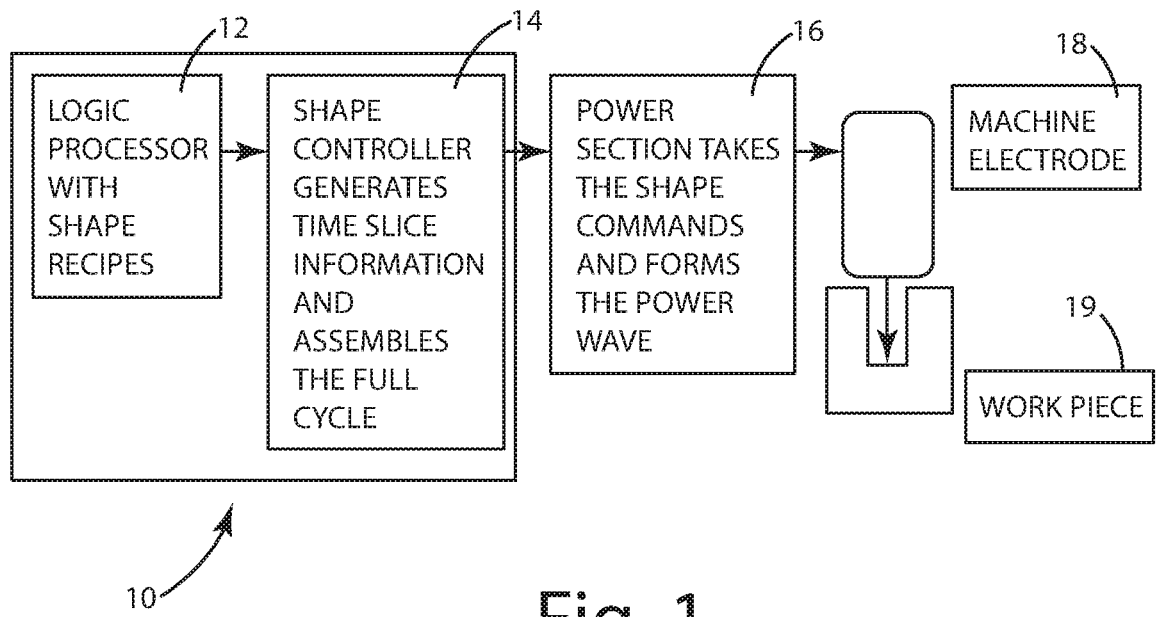
FIG. 1 is a schematic illustration of the EDM control system in accordance with an embodiment of the present invention.

Before the embodiments of the invention are explained, it is to be understood that the invention is not limited to the details of operation or to the details of construction; and the arrangement of the components set forth in the following description or illustrated in the drawings. The invention may be implemented in various other embodiments and may be practiced or carried out in alternative ways not expressly disclosed herein.

In addition, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

An EDM system is illustrated in FIG. 1 and generally designated 10. The EDM system 10 generally includes a logic processor 12, a shape controller 14, a power section 16, and a machine electrode 18. The electrode 18 works on a workpiece 19.

The logic processor 12 includes memory (not separately shown) in which one or more logical waveforms or wave shape are stored.

The shape controller 14 generates the time slice information or profile required to approximate, simulate, or otherwise define a logical waveform. The time slice information is stored as a recipe defining the logical waveform. The time slice information includes a plurality of time slices each having a voltage and a width. The shape controller develops or creates the time slice information as a function of the logical waveform. Alternatively, the recipes may be calculated externally of the shape controller 14, and then inputted into the shape controller. The signals from the shape controller 14 are sent to the power section 16 to reproduce the wave and high-power.

The wave shaping may be implemented using a Delta Tau Acc-84E circuit board including custom logic. This approach enables tables of data to be loaded into the circuit board. The data tables enable the definition of the steps or time slices within the electrical cycle. The steps or time slices may be 2 milliseconds (ms) wide or faster if possible. Time slices or steps may be defined to build essentially any shape of waveform. The definition may be of a single cycle, and the circuit board will repeat the cycle at the cycle rate desired. Preferably, multiple tables may be loaded at any one time to enable ready quick switching, for example within a particular hole in a particular workpiece.

The shape controller 14 presently includes two analog 0-10 VDC outputs. One output is representative of the 0-100 VDC output voltage as measured at the power section output terminals (independent of the output polarity), and the other output is representative of the 0-50 A output of the power section 16 measured at the output terminals (independent of the output polarity).

The power section 16 receives the time slice information or "shape commands" from the shape controller 14 to form the power wave to be delivered to the machine electrode 18. The power section 16 amplifies the voltage of each time slice to create a power voltage wave. The power section 16 may include electronic current limiting, which may be adjustable for example using the logic processor 12.

The power section 16 may contain an H bridge power section, capable of switching the polarity of the output voltage at will. The switching time preferably is in the range of milliseconds, and even more preferably faster. Both legs of the power section 16 may be electrically floating to allow for proper machine grounding. The maximum current may be 50 amps (A) using 5-amp steps. The power section 16 preferably includes solid-state current-limiting control. Further preferably, the solid-state current-limiting logic replaces the large inefficient power resistors used in the prior art to protect the output devices.

Figure 2:
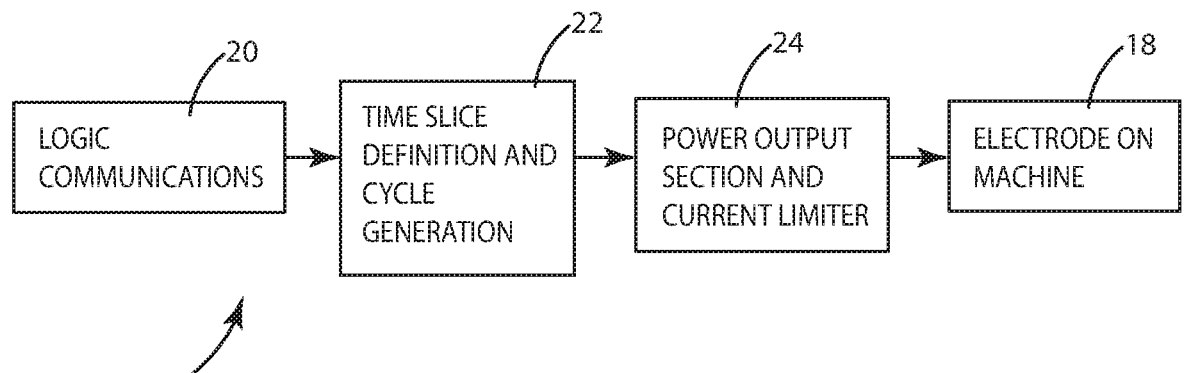
FIG. 2 is flow diagram of the EDM control system.
Figure 3:
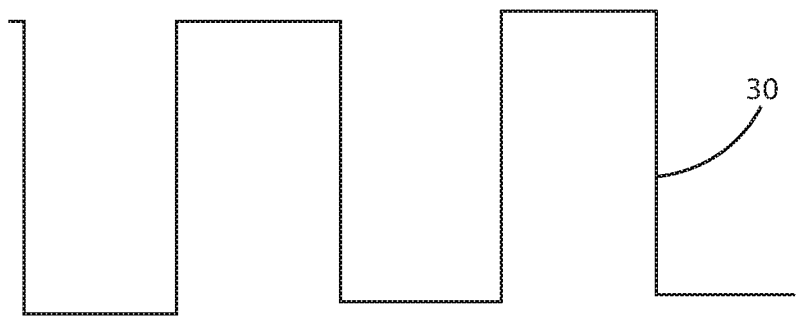
FIG. 3 is an illustration of a prior art EDM standard waveform.

The logic flow of the system 10 is illustrated schematically in FIG. 2. A user or operator defines 20 logic communications to define one or more logical waveforms. The logic communications are used to create 22 the time slice information and cycle generation that collectively define the recipe for a logical waveform. The time slice definitions are used to output power and to limit current 24 by the power section 16 (see FIG. 1) to deliver power to the electrode 18.

Figure 4:
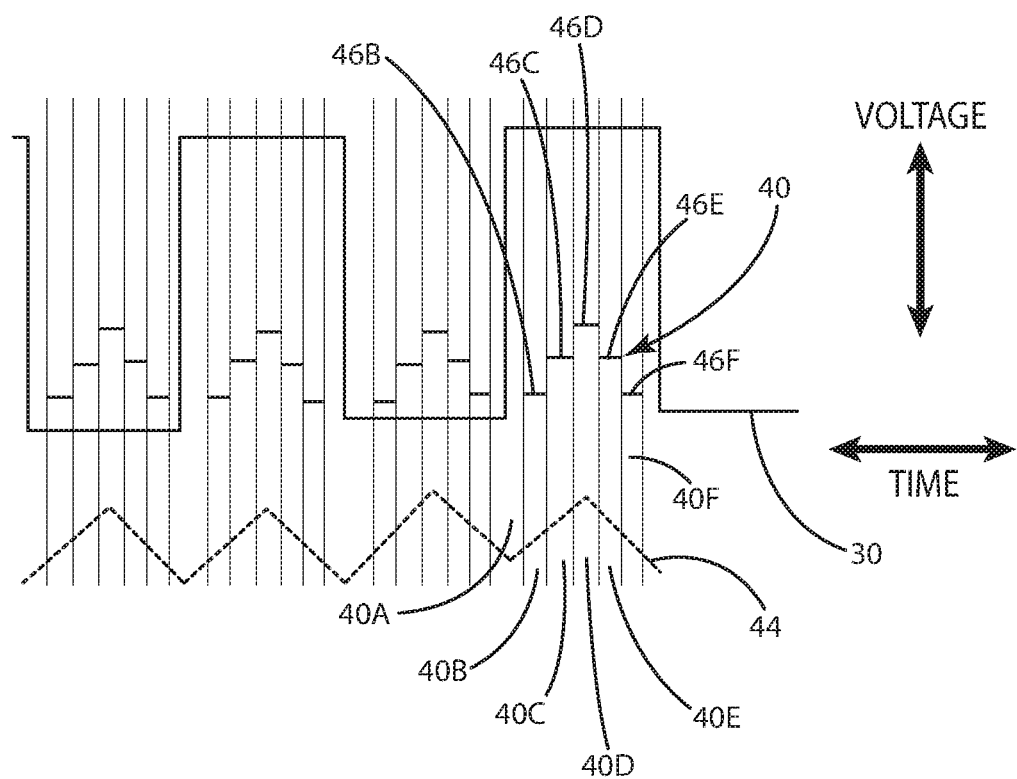
FIG. 4 is an illustration of a first logical waveform defined by time slices of voltages.

FIG. 4 illustrates a first logical waveform 40 created using the present invention. The logical waveform 40, transferred to the power section, produces a resultant wave 44 represented as a logical saw-tooth waveform. Each cycle of the logical saw-tooth waveform 44 is in actuality six "time slices" 40A, 40B, 40C, 40D, 40E, and 40F. The time slice 40A is zero voltage. The time slices 40B and 40F are relatively low voltages 46B and 46F equivalent to one another. The time slices 40C and 40E are relatively medium voltages 46C and 46E equivalent to one another. The time slice 40D is a relatively high voltage 46D at the peak of the waveform. The time slices 40A through 40F together approximate or define the logical waveform 44.

Figure 5:
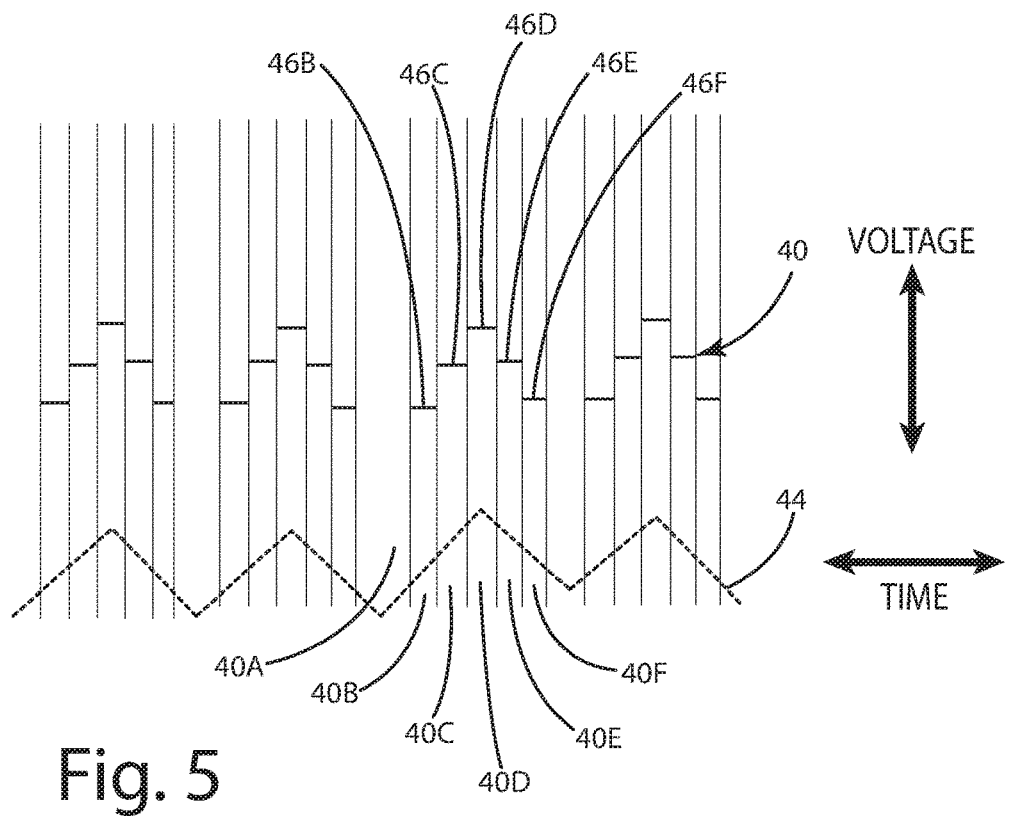
FIG. 5 is an illustration of the first logical waveform with the standard waveform removed.

FIG. 5 is essentially FIG. 4 with the logical standard waveform 42 removed.

Figure 6:
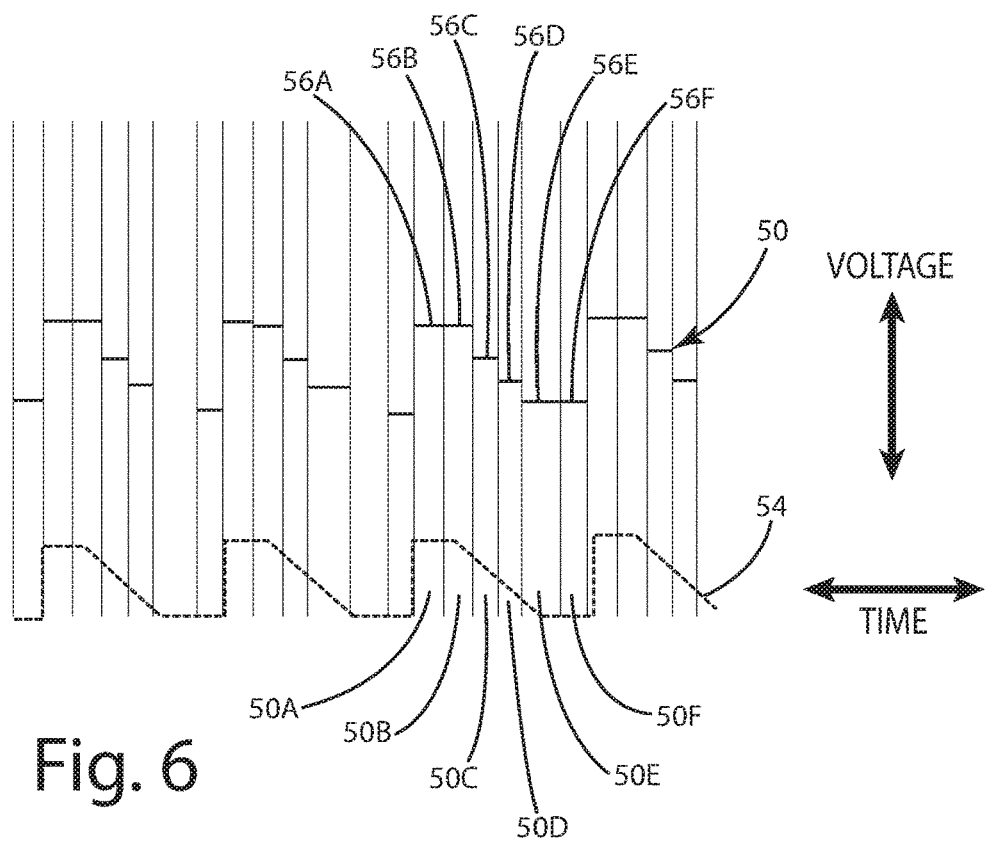
FIG. 6 is an illustration of a second logical waveform defined by time slices of voltages.

FIG. 6 illustrates a second logical waveform 50 also created using the present invention. The logical waveform 50, transferred to the power section, produces a resultant wave 54 represented as a complex logical waveform 54. As illustrated, each wave of the logical waveform 50 is in actuality six "time slices" 50A, 50B, 50C, 50D, 50E, and 50F. The time slices 50A and 50B are relatively high voltages 56A and 56B equivalent to one another. The time slices 50C and 50D are steps down in voltage 56C and 56D from time slices 50A and 50B. The time slices 50E and 50F are relatively low voltages 56E and 56F equivalent to one another. The time slices 50A-50F together approximate or define the logical waveform 50.

Using the present invention, logical waveforms may be built from time slices stored in a recipe file. The possible logical waveforms are limited only by the width of the time slices and the switching speed of the output power section 16. A table of the time slice information may be generated using the shape controller 14. Each time slice has a voltage that can be positive, negative, or shifted from ground potential. The time slices together assemble into a cycle of the waveform. The cycles are repeated at a desired frequency to generate an output train delivered to the power section 16. The power section amplifies this train of cycles and delivers it to the work piece 19 via the electrode 18.

Voltage and current can be adjusted to control the generated heat at any point in the logical waveform. The ability to shift the ground potential provides an ability to maintain a continuous burn or arc, while adjusting the voltage on top of the wave.

The system 10 departs from standard power supply designs, which typically control the on and off time of a square wave. The system 10 enables control of multiple time slices within the positive or negative portion of the logical wave. Each time slice can have a different voltage, enabling the building of wave shapes in small steps.

The present invention enables essentially any waveform to be built and cycled at a frequency up to the electronics maximum component switching speed in Hertz (Hz). Complex waveforms can be built and repeated at frequencies as needed.

Logical waveforms and waveform recipes may be stored and selected for high-speed recall.

Polarities may be reversed and the DC "zero level" can be shifted both positive and negative.

Varying current levels can be selected for a particular application.

The ability to define the wave in time slices eliminates the need for capacitor or resistor shaping circuits.

The above description is that of current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An EDM method comprising the steps of:
   defining a logical waveform;
   storing the logical waveform in a memory;

creating time slice information defining the logical waveform, the time slice information including a plurality of adjacent sequential time slices each having an amplitude and a width, each amplitude being uniform throughout the width of the associated time slice;

storing the time slice information in the memory; and amplifying the amplitude of each time slice in the time slice information to create a corresponding power voltage to be delivered to an EDM electrode.

2. An EDM method as defined in claim 1 wherein each amplitude represents the corresponding power voltage.

3. An EDM method as defined in claim 1 wherein the widths are uniform.

4. An EDM method as defined in claim 1 wherein the widths are non-uniform.

5. An EDM method as defined in claim 1 wherein the logical waveform includes a shifted ground potential.

6. An EDM system comprising:

a logic processor including a memory for storing a logical waveform;

a shape controller for receiving the logical waveform from the logic processor and for generating time slice information defining the logical waveform, the time slice information including a plurality of adjacent sequential time slices each having an amplitude and a width, each amplitude being uniform throughout the width of the associated time slice, the memory additionally for storing the time slice information; and a power section for receiving the time slice information from the shape controller, for amplifying the amplitude of each time slice in the time slice information to create a corresponding power voltage, and for delivering the power voltages to an EDM electrode.

7. An EDM system as defined in claim 6 wherein each amplitude represents the corresponding power voltage.

8. An EDM system as defined in claim 6 wherein the widths are uniform.

9. An EDM system as defined in claim 6 wherein the widths are non-uniform.

10. An EDM system as defined in claim 6 wherein the logical waveform includes a shifted ground potential.

* * * * *